United States Patent
Seibert et al.

(10) Patent No.: US 11,146,966 B2
(45) Date of Patent: Oct. 12, 2021

(54) CONFIGURING A NETWORK OF DEVICES TO OPERATE WITHIN A TELEVISION WHITESPACE SPECTRUM

(71) Applicant: SILVER SPRINGS NETWORKS, INC., Redwood City, CA (US)

(72) Inventors: Cristina Seibert, Mountain View, CA (US); John Notor, San Jose, CA (US); George H. Flammer, III, Cupertino, CA (US)

(73) Assignee: ITRON NETWORKED SOLUTIONS, INC., Liberty Lake, WA (US)

( * ) Notice: Subject to any disclaimer, the term of this patent is extended or adjusted under 35 U.S.C. 154(b) by 153 days.

(21) Appl. No.: 13/921,004

(22) Filed: Jun. 18, 2013

(65) Prior Publication Data
US 2014/0369270 A1      Dec. 18, 2014

(51) Int. Cl.
*H04W 16/14*      (2009.01)
*H04L 27/00*      (2006.01)

(52) U.S. Cl.
CPC ......... *H04W 16/14* (2013.01); *H04L 27/0006* (2013.01)

(58) Field of Classification Search
None
See application file for complete search history.

(56) References Cited

U.S. PATENT DOCUMENTS

| | | | | |
|---|---|---|---|---|
| 6,549,781 B1 * | 4/2003 | O'Byrne | .................. | H04L 1/24 455/423 |
| 7,353,001 B1 * | 4/2008 | Ngan | .................. | H04B 7/0695 455/522 |
| 7,551,587 B2 * | 6/2009 | Iacono | ................. | H04W 52/34 370/332 |
| 7,564,816 B2 * | 7/2009 | McHenry | ............. | H04W 16/14 370/329 |
| 7,876,729 B1 * | 1/2011 | Grilli | .................... | H04W 36/14 370/332 |
| 8,156,239 B1 * | 4/2012 | Ashrafi | ................. | H04L 65/105 709/231 |
| 9,131,503 B2 * | 9/2015 | Ishii | ........................ | H04W 8/22 |
| 9,478,857 B2 * | 10/2016 | Chang | .................. | H04B 7/0617 |
| 2003/0017837 A1 * | 1/2003 | Kalliojarvi | .......... | H04W 52/343 455/522 |
| 2003/0066897 A1 * | 4/2003 | Garner | ............... | G05D 23/1905 236/51 |

(Continued)

OTHER PUBLICATIONS

International Search Report, Application No. PCT/US2014/039278, dated Sep. 23, 2014.

*Primary Examiner* — Andrew C Oh
(74) *Attorney, Agent, or Firm* — Artegis Law Group, LLP

(57) ABSTRACT

Nodes within a network are configured to communicate with one another on one or more television white space (TVWS) frequencies that may be subject to interference caused by nearby TV towers. In order to mitigate that interference, the nodes may be configured to communicate according to specific operating parameters. The operating parameters may be generated based on expected interference levels caused by the nearby TV towers or QOS metrics associated with available channels. The nodes may also update a private database to reflect the expected interference levels or measured QOS metrics for different channels.

29 Claims, 10 Drawing Sheets

(56) References Cited

U.S. PATENT DOCUMENTS

| | | | |
|---|---|---|---|
| 2003/0117981 A1* | 6/2003 | Tillotson | H04W 52/08 370/337 |
| 2004/0082311 A1* | 4/2004 | Shiu | H04B 7/0613 455/403 |
| 2004/0190641 A1* | 9/2004 | Ojard | 375/261 |
| 2005/0039103 A1* | 2/2005 | Azenko | H04L 1/0072 714/776 |
| 2006/0109799 A1* | 5/2006 | Tseng | H04L 45/02 370/254 |
| 2006/0114471 A1* | 6/2006 | Cyr | G01M 11/337 356/477 |
| 2007/0067296 A1* | 3/2007 | Malloy | H04L 41/145 |
| 2007/0258540 A1* | 11/2007 | Ratasuk | H04J 11/005 375/267 |
| 2008/0056227 A1* | 3/2008 | Love | H04L 1/0027 370/343 |
| 2008/0062922 A1* | 3/2008 | Qi | H04W 36/08 370/331 |
| 2008/0299955 A1* | 12/2008 | Lee | H04L 12/189 455/414.1 |
| 2009/0054019 A1* | 2/2009 | Tamura | H04W 52/52 455/127.1 |
| 2009/0093222 A1* | 4/2009 | Sarkar | H04B 17/21 455/115.1 |
| 2009/0150819 A1* | 6/2009 | Cheong | H04M 1/72457 715/771 |
| 2009/0163221 A1* | 6/2009 | Abedi | H04W 16/10 455/452.1 |
| 2009/0191813 A1* | 7/2009 | Abedi | H04W 16/14 455/62 |
| 2010/0130133 A1* | 5/2010 | Lou | H04W 88/08 455/63.1 |
| 2010/0254305 A1* | 10/2010 | Shimobayashi | H04L 1/0042 370/328 |
| 2010/0317361 A1* | 12/2010 | Hu | H04W 52/283 455/450 |
| 2011/0043281 A1* | 2/2011 | Golden | H03F 3/45475 330/124 R |
| 2011/0081897 A1* | 4/2011 | Beattie, Jr. | H04W 40/36 455/418 |
| 2011/0122787 A1* | 5/2011 | Wang | H04B 17/336 370/252 |
| 2011/0280180 A1* | 11/2011 | McCann | H04W 48/14 370/328 |
| 2011/0280228 A1* | 11/2011 | McCann | H04W 48/14 370/338 |
| 2011/0293268 A1* | 12/2011 | Britz | H04B 10/90 398/26 |
| 2011/0310840 A1* | 12/2011 | Kennedy | H04W 48/14 370/331 |
| 2011/0317019 A1* | 12/2011 | Bahl et al. | 348/180 |
| 2012/0020320 A1* | 1/2012 | Issakov | G01S 5/06 370/330 |
| 2012/0220851 A1* | 8/2012 | Razansky | G01N 21/1702 600/407 |
| 2012/0281610 A1* | 11/2012 | Ai | H04W 4/06 370/312 |
| 2013/0029706 A1* | 1/2013 | Sachs | H04W 16/14 455/501 |
| 2013/0064145 A1* | 3/2013 | Husth | H03G 3/3073 370/280 |
| 2013/0078924 A1 | 3/2013 | Choudhury | |
| 2013/0115984 A1* | 5/2013 | Schmidt et al. | 455/501 |
| 2013/0122819 A1* | 5/2013 | Vuyyuru et al. | 455/62 |
| 2013/0156210 A1* | 6/2013 | Shaw | G10K 11/16 381/66 |
| 2013/0203429 A1* | 8/2013 | Kneckt | H04W 72/1263 455/450 |
| 2013/0260757 A1* | 10/2013 | Deivasigamani | H04W 24/00 455/435.3 |
| 2013/0288737 A1* | 10/2013 | Nentwig | H04W 52/267 455/522 |
| 2014/0003282 A1* | 1/2014 | Kafle | H04W 48/14 370/254 |
| 2014/0105118 A1* | 4/2014 | Senarath | H04W 52/244 370/329 |
| 2014/0133498 A1* | 5/2014 | Sato | H04L 1/0057 370/474 |
| 2014/0241259 A1* | 8/2014 | Wu | H04W 16/14 370/329 |
| 2014/0274089 A1* | 9/2014 | Hassan | H04W 24/02 455/452.1 |
| 2014/0274103 A1* | 9/2014 | Steer | H04W 16/14 455/454 |
| 2014/0323152 A1* | 10/2014 | Zhang | H04W 64/00 455/456.1 |
| 2014/0335909 A1* | 11/2014 | Czerepinski | H04W 52/40 455/522 |
| 2014/0341150 A1* | 11/2014 | Kimura | H04W 24/02 370/329 |
| 2015/0003350 A1* | 1/2015 | Yu | H04B 7/0452 370/329 |
| 2015/0119059 A1* | 4/2015 | Miao | H04W 16/10 455/452.1 |
| 2016/0128076 A1* | 5/2016 | Langereis | H04L 5/006 370/336 |

\* cited by examiner

| PK | LATITUDE | LONGITUDE | CHANNEL | QOS | NODELID | TIMESTAMP |
|---|---|---|---|---|---|---|
| 0 | N37° 29.0701" | W122° 13.6633" | 4 | .2 | 451346 | 2013-03-25T19:00Z |
| 1 | N37° 26.6786" | W122° 9.6474" | 12 | .6 | 987256 | 2013-03-26T01:10Z |
| 2 | N37° 46.6271" | W122° 25.1784" | 13 | .1 | NULL | 2013-04-01T03:30Z |
| ... | ... | ... | ... | ... | ... | ... |
| N | N37° 27.2613" | W122° 10.6741" | 7 | .8 | 871293 | 2013-04-02T19:00Z |

FIG. 7

CONFIGURING A NETWORK OF DEVICES TO OPERATE WITHIN A TELEVISION WHITESPACE SPECTRUM

BACKGROUND OF THE INVENTION

Field of the Invention

Embodiments of the present invention relate generally to wireless digital communication and, more specifically, to configuring a network of devices to operate within a television whitespace spectrum.

Description of the Related Art

Television white space (TVWS) devices are wireless devices configured to operate within white space frequency bands associated with the television frequency spectrum. Under various circumstances, TVWS devices may be exposed to high levels of interference from TV towers, thereby impairing the capacity of the TVWS device to transmit and/or receive data effectively.

For example, if a TVWS device resides sufficiently close to a TV tower, then transmissions generated by the TV tower may interfere with data communications associated with the TVWS device. Alternatively, if a TVWS device communicates on a frequency that is sufficiently close to a frequency used by the TV tower, then transmissions generated by the TV tower may likewise interfere with communications associated with the TVWS device. These two factors may also compound one another, and so in situations where TVWS device resides close to a TV tower and also communicates on a frequency used by the TV tower, that TVWS device may experience very high levels of interference.

The issues described above are especially problematic when TVWS devices operate as nodes within a network and are configured to interoperate with each other to support operation of the network as whole. If TV tower interference impairs the ability of the TVWS devices to communicate with one another, then the interoperation of those devices may be likewise impaired, and, consequently, the overall operation of the network may suffer.

As the foregoing illustrates, what is needed in the art is an improved technique for configuring devices that operate within a TVWS spectrum.

SUMMARY OF THE INVENTION

One embodiment of the present invention sets forth a computer-implemented method for configuring a node to communicate on a television white space (TVWS) spectrum of frequencies, including receiving a request for at least one operating parameter from a first node that resides at a first location in a network, retrieving one or more entries associated with the first location from a first database, where each of the one or more entries reflects a quality of service metric for a TVWS channel at the first location, determining the at least one operating parameter for the first node based on the one or more entries, where the at least one operating parameter indicates a first TVWS channel, and transmitting the at least one operating parameter to the first node, where the first node is configured to perform future communication operations over the first TVWS channel according to the at least one operating parameter.

One advantage of the disclosed approach is that a network of nodes is configured to perform wireless communications within a TVWS spectrum despite interference that may be caused by nearby TV towers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a conceptual diagram that illustrates an exemplary table in an optimized database shown in FIG. 4 that includes quality of service metrics for channels on which the nodes of FIG. 4 may communicate, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
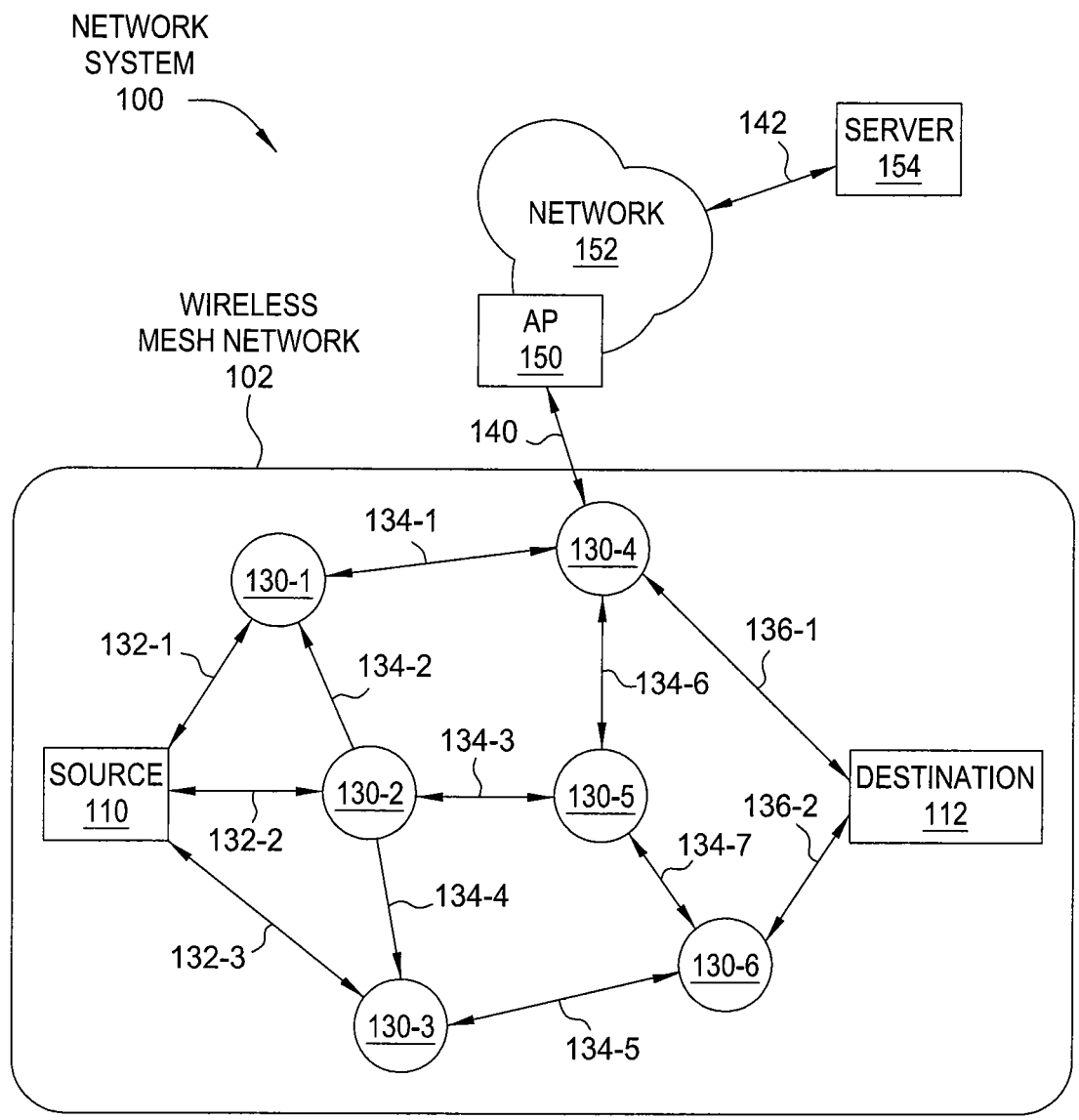
FIG. 1 illustrates a network system, according to one embodiment of the present invention.

FIG. 1 illustrates a network system 100, according to one embodiment of the present invention. The network system 100 includes, without limitation, a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. One skilled in the art will understand that any technically feasible discovery protocol may be implemented without departing from the scope and spirit of embodiments of the present invention.

The discovery protocol may also be implemented to determine the hopping sequences of adjacent nodes, i.e. the sequence of channels across which nodes periodically receive payload data. As is known in the art, a "channel" may correspond to a particular range of frequencies. Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In another embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In yet another embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting. Exemplary details of server 154 are described in greater detail below in conjunction with FIG. 3.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. Each node 130 may implement the first and/or second embodiments of the invention, as described above, by operation of the network interface. An exemplary network interface is described below in conjunction with FIG. 2.

Figure 2:
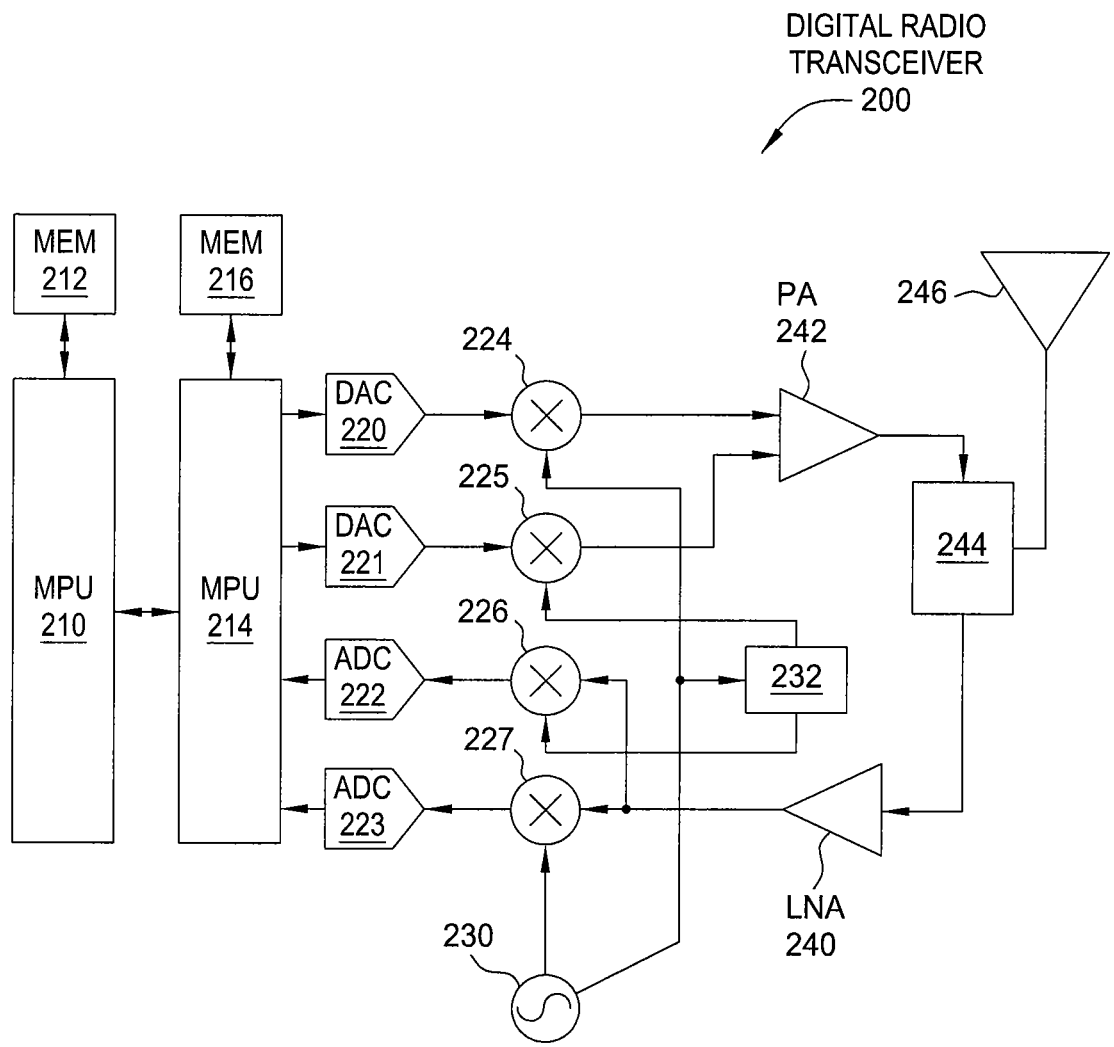
FIG. 2 illustrates a network interface configured to transmit and receive data within the wireless mesh network of FIG. 1, according to one embodiment of the present invention.

FIG. 2 illustrates a network interface configured to transmit and receive data within the wireless mesh network of FIG. 1, according to one embodiment of the present invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In one embodiment, MPU 210 implements the techniques performed by the node, as described in conjunction with FIGS. 1 and 3-7, when MPU 210 executes a firmware program stored in memory within network interface 200.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
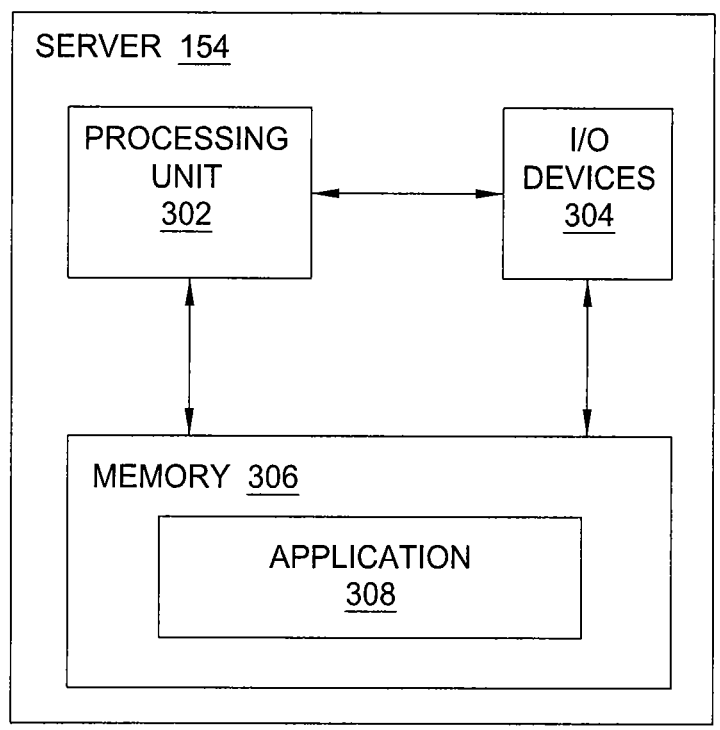
FIG. 3 is a block diagram that illustrates the server of FIG. 1 in greater detail, according to one embodiment of the present invention.

FIG. 3 is a block diagram that illustrates server 154 of FIG. 1 in greater detail, according to one embodiment of the present invention. In this particular embodiment, server 154 comprises a computing device capable of processing data by executing program instructions stored in memory. Server 154 may also more broadly comprise any type of machine capable of processing data. As shown, server 154 includes, without limitation, a processing unit 302, input/output (I/O) devices 304, and memory 306. As also shown, processing unit 302, I/O devices 304, and memory 306 are coupled to one another.

Processing unit 302 may include one or more central processing unit (CPUs), parallel processing units (PPUs), graphics processing units (GPUs), application-specific integrated circuits (ASICs), field-programmable gate arrays (FPGAs), or any other type of processing unit capable of processing data. In addition, processing unit 156 may include various combinations of processing units, such as, e.g., a CPU coupled to a GPU.

I/O devices 304 may include input devices, such as a keyboard, a mouse, a touchpad, a microphone, a video camera, and so forth, as well as output devices, such as a screen, a speaker, a printer, a projector, and so forth. In addition, I/O devices 304 may include devices capable of performing both input and output operations, such as a touch screen, an Ethernet port, a universal serial bus (USB) port, a serial port, etc. I/O devices 304, as well as processing unit 302 described above, are both configured to read data from and write data to memory 306.

Memory 306 may include a hard disk, one or more random access memory (RAM) modules, a database, and so forth. In general, any technically feasible unit capable of storing data may implement memory 306. Memory 306 includes an application 308 that may be executed by processing unit 302 to perform the various functions of server 154 described herein. Persons skilled in the art will recognize that the block diagram shown in FIG. 3 illustrates just one possible implementation of server 154, and that any system or combination of systems configured to perform the functionality of server 154 described herein falls within the scope of the present invention.

Operating within a TVWS Spectrum

Figure 4:
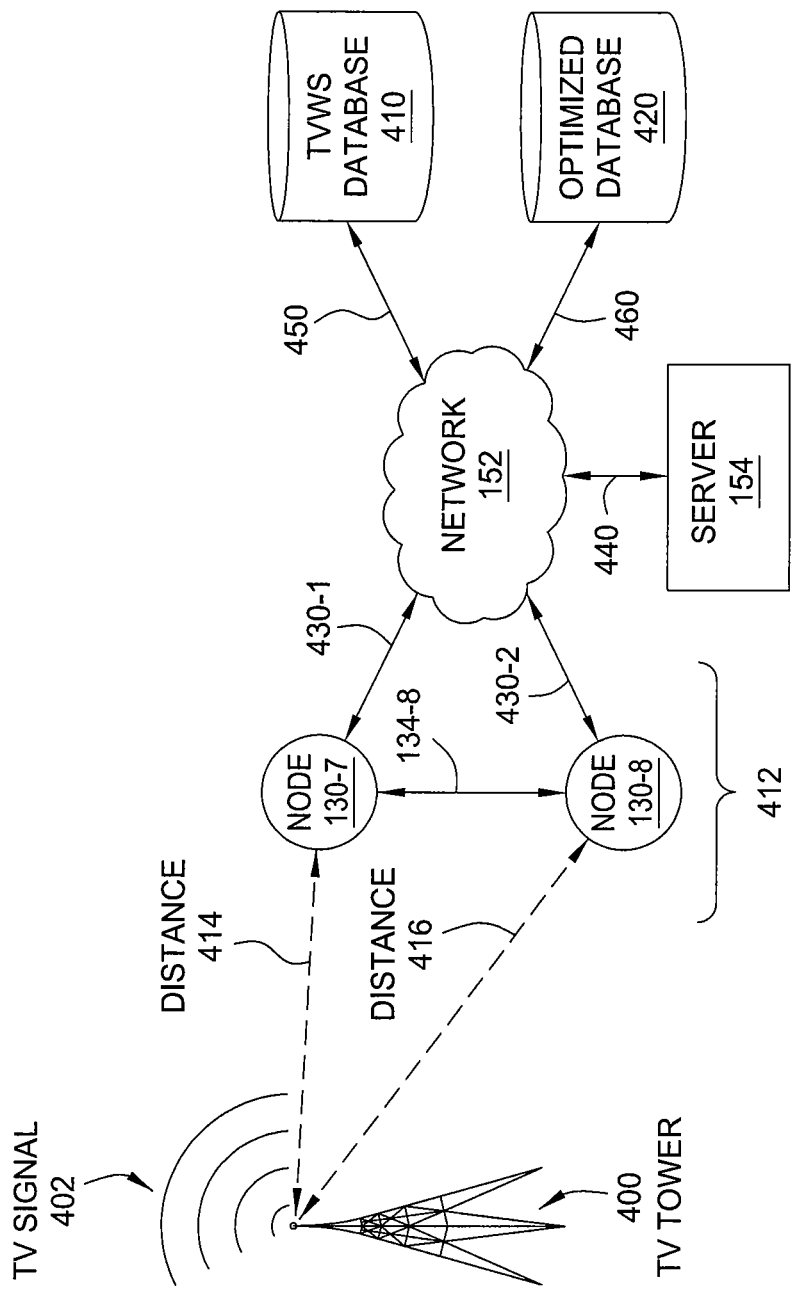
FIG. 4 is a conceptual diagram that illustrates a portion of the wireless mesh network of FIG. 1 that is subject to interference caused by a TV signal, according to one embodiment of the present invention.

FIG. 4 is a conceptual diagram that illustrates a portion 412 of the wireless mesh network 102 of FIG. 1 that is subject to interference caused by a TV signal 402, according to one embodiment of the present invention. As a general matter, FIG. 4 includes some of the same components as those shown in FIG. 1; however, certain components have been omitted, for the sake of simplicity, while other components have been added. As shown, FIG. 4 includes a television (TV) tower 400, node 130-7 and node 130-8 (referred to hereinafter collectively as nodes 130, unless otherwise noted), network 152, server 154, a TVWS database 410, and an optimization database 420.

Nodes 130, server 154, authorization database 410, and optimized database 420 are coupled together via network 152. Nodes 130-7 and 130-8 are coupled to network 152 by communication links 430-1 and 430-2, respectively, server 154 is coupled to network 152 by a communication link 440, TVWS database is coupled to network 152 by a communication link 450, and optimized database is coupled to network 152 by a communication link 460. Nodes 130-7 and 130-8 are also coupled to one another by a communication link 134-8.

Nodes 130 are configured to interoperate with each other and to participate in the overall operation of wireless mesh network 102. In doing so, nodes 130 are configured to perform data communications on channels associated with TV white space (TVWS) spectrum frequencies. Nodes 130 may communicate on a channel corresponding to a particular TVWS frequency, or may implement a frequency hopping sequence within a channel corresponding to a given range of TVWS frequencies. Nodes 130 may interact with server 154 in order to determine one or more specific TVWS channels on which to communicate. Server 154 may, in turn, access TVWS database 410 in order to determine the TVWS channels that are currently available at the location occupied by nodes 130.

TVWS database 410 is a public database that records available TVWS channels for different physical locations. The different TVWS channels available for a particular physical location correspond to frequencies that are not currently in use by any TV towers proximate to the physical location. TVWS database 410 may also record transmitter settings for the TV towers proximate to a given physical location, including a transmitter power and transmitter frequency range. In one embodiment, TVWS database 410 may be implemented by multiple different databases each configured to store a different type of data. Server 154 is configured to communicate with TVWS database 410, on behalf of nodes 130, in order to select a particular channel on which those nodes 130 should communicate, as mentioned above and as described in greater detail herein. Server 154 may also communicate with optimized database 420 in order to retrieve quality-of-service (QOS) metrics for specific channels.

Optimized database 420 is a private database that records QOS metrics for different TVWS channels. Server 154 or nodes 130 may compute QOS metrics for different TVWS channels based on power loss models, as described in greater detail herein and below in conjunction with FIGS. 6 and 8. Alternatively, nodes 130 may determine QOS metrics for different TVWS channels based on measurements performed while communicating on those channels. Nodes 130 may then report those QOS metrics to optimized database 420 by way of server 154, as described in greater detail herein and below in conjunction with FIGS. 7 and 9-10.

In FIG. 4, node 130-7 resides at a distance 414 from TV tower 400 and node 130-8 resides at a distance 416 from TV tower 400. At those distances, nodes 130 may be subject to interference caused by TV signal 402 that is generated by TV tower 400. For example, if distance 414 is sufficiently small, then node 130-7 may be subject to interference caused by TV signal 402. Nodes 130 may also be subject to interference caused by TV signal 402 when nodes 130 communicate on a channel that is close to a frequency in use by TV tower 400 to generate TV signal 402, as described in greater detail below in conjunction with FIG. 5.

Figure 5:
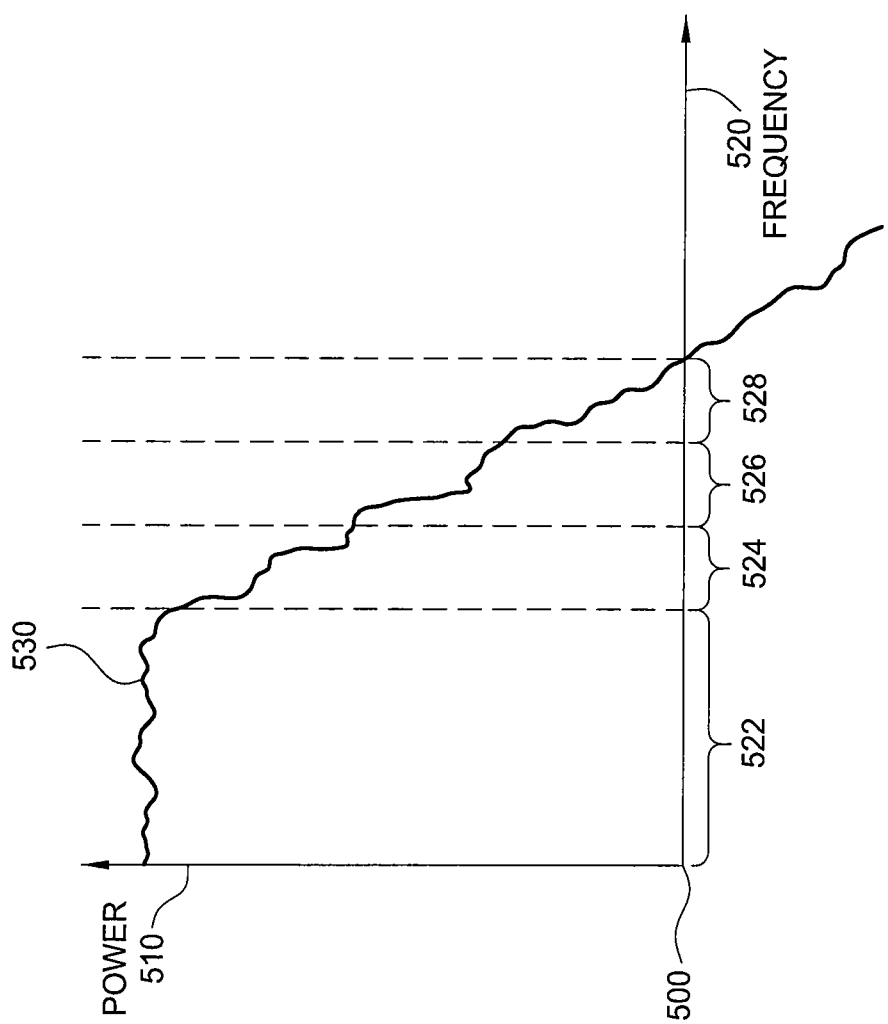
FIG. 5 is a conceptual diagram that illustrates a graph of power versus frequency for the TV signal of FIG. 4, according to one embodiment of the present invention.

FIG. 5 is a conceptual diagram that illustrates a graph of power versus frequency for the TV signal of FIG. 4, according to one embodiment of the present invention. Graph 500 is described herein for exemplary purposes only to illustrate the different levels of interference that may be caused by TV signal 402 generated by TV tower 400. As shown, graph 500 includes a power axis 510, a frequency axis 520, and a plot 530 of power versus frequency. Frequency axis 520 is divided into specific ranges of frequencies, or channels, including channel 522, channel 524, channel 526, and channel 528. In the exemplary embodiment discussed herein, TV tower 400 transmits TV signal 402 on channel 522, while nodes 130 communicate with one another and with server 154 on channel 524.

The amount of power associated with TV signal 402 should, under ideal circumstances, be limited to just the frequencies associated with channel 522. However, under normal circumstances, TV signal 402 may also generate power at frequencies extending beyond channel 522 into channels 524, 526, and 528, as is shown. Accordingly, nodes 130 operating on channel 524 may be subject to interference derived from TV signal 402.

Referring back now to FIG. 4, server 154 is configured to mitigate the interference caused by TV signal 402 by generating an expected interference level for each channel that is available to nodes 130 at the location occupied by nodes 130. Sever 154 may then determine a set of operational parameters for nodes 130 that allow those nodes to effectively communicate despite the interference that may be caused by TV signal 402. Server 154 may determine similar or different operational parameters for each of nodes 130. The set of operational parameters may include a variety of different parameters that influence the operation and/or configuration of the nodes 130.

For example, the operational parameters determined for a given node 130 could include a selected channel on which to communicate, a particular sensitivity with which to process received signals, a target signal-to-noise ratio implemented for a signal to be transmitted, or other parameters that may influence the quality and strength of signals involved with communication with other nodes 130. In one embodiment, server 154 may cause a node 130 to power off in order to conserve power when subject to high levels of interference.

In one embodiment, server 154 may compute the expected interference level for each channel that is available to nodes 130 at the location occupied by those nodes, and then select the channel with the lowest expected interference. Server 154 may also adjust additional operational parameters to optimize communications associated with the selected channel. In another embodiment, server 154 computes the expected interference level for a predetermined channel and then adjusts additional operational parameters for nodes 130 to optimize communications associated with the predetermined channel. Server 154 may also cause a node 130 to switch channels when the expected interference level associated with that node 130 exceeds a threshold value.

Server 154 may compute the expected interference level at a given channel and location based on power loss models that reflect the power loss of TV signal 402 at the given channel and location. For example, one power loss model may reflect the power that is lost by TV signal 402 as a function of frequency separation between TV signal 402 and the given channel. Another power loss model could reflect the power that is lost by TV signal 402 as a function of physical distance between the TV tower 400 and the node 130. Server 154 could combine these two models to compute the overall interference level at the given channel and location.

In doing so, server 154 may determine the initial transmission frequency and power level of TV signal 402 (e.g., by communicating with TVWS database 410). Then, server 154 may apply the different power loss models mentioned above to identify an amount of power remaining within TV signal 402 at a specific frequency and at a specific distance from TV tower 400. Two exemplary power loss models are discussed in greater detail below in conjunction with FIG. 6.

Figure 6:
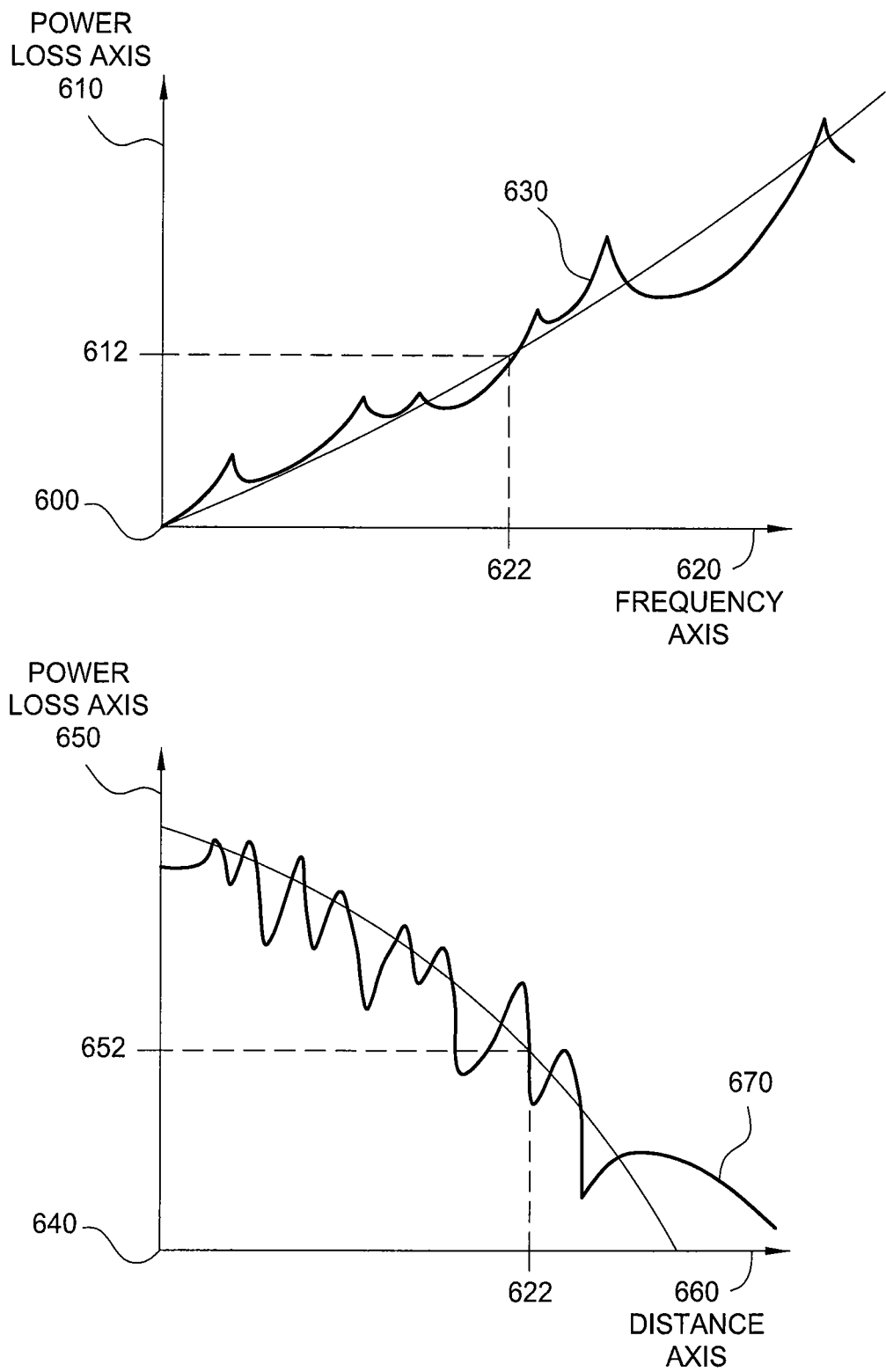
FIG. 6 illustrates various graphs that reflect estimated signal attenuation of the TV signal of FIG. 4, according to one embodiment of the present invention.

FIG. 6 illustrates various graphs that reflect estimated signal attenuation of TV signal 402 of FIG. 4, according to one embodiment of the present invention. Graphs 600 and 640 are described herein for exemplary purposes only to illustrate estimated power loss of TV signal 402 as a function of different parameters.

Graph 600 represents one power loss model that server 154 may implement. As shown, graph 600 includes a power loss axis 610, a frequency axis 620, and a plot 630 of power loss versus frequency. For a given frequency 622, plot 630 indicates a power loss 612 of TV signal 402. Power loss 612 represents the amount of power that is lost between the original frequency at which TV signal 402 is transmitted, and frequency 622. Frequency 622 could be, e.g., a frequency at which the nodes 130 may communicate. In one embodiment, server 154 computes the power loss of TV signal 402 as $11.5*(deltaF+3.6)$, where deltaF is the frequency difference between TV signal 402 and any channel on which the nodes 130 may communicate.

Graph 640 represents another power loss model that server 154 may implement. As shown, graph 640 includes a power loss axis 650, a frequency axis 660, and a plot 670 of power loss versus distance. For a given distance 662, plot 670 indicates power loss 652 of TV signal 402. Power loss 652 represents the amount of power that is lost due to propagation of TV signal 402 between TV tower 400 and the node 130. That distance could be, e.g. distance 414 or 416. In one embodiment, the power loss model represented by graph 640 corresponds to the Hata loss model, the Erceg loss model, or another path loss model.

Server 154 may compute the total power loss of TV signal 402 by combining the two power loss models. Based on this total power loss, and based on the initial transmission frequency and power level associated with TV signal 402, the node 130 may compute the expected interference level due to TV signal 402 at a given frequency and distance from TV tower 402. In one embodiment, the expected amount of interference is computed as: interference=initial power of TV signal 402−power loss due to frequency separation−power loss due to physical separation.

Referring back now to FIG. 4, sever 154 is configured to compute the expected interference level caused by TV signal 402 for a set of available TVWS channels by implementing the techniques described above in conjunction with FIG. 5. Server 154 may then determine operating parameters for nodes 130, including a channel on which those nodes 130 should communicate, and transmit those operating parameters to nodes 130. Nodes 130 may then communicate with one another despite being subject to interference caused by TV signal 402.

In one embodiment, nodes 130 may also implement some or all of the functionality previously described as being performed by server 154. For example, a given node 130 could communicate with TVWS database 410 to determine a set of available channels at a particular location as well as transmitter settings associated with any nearby TV towers. The given node 130 could then implement the techniques described in conjunction with FIG. 5, or a simplified version of those techniques, and then determine new operating parameters with which future communications should be performed. The simplified version of those techniques could include accessing a look-up table indexed based on interference levels that provides specific operating parameters corresponding to specific interference levels.

Nodes 130 may also modify existing operating parameters based on data retrieved from TVWS database 410 that reflects the operation of other TVWS devices not included within network 102, including the location of those devices, power settings, modulation settings, data rates, occupancy, duty cycles, synchronization between those devices, or other such information. Nodes 130 may also cooperate with one another to determine common operating parameters with which to communicate based on duty cycle, communication protocol, power levels, and so forth.

In addition, nodes 130 may determine or modify operating parameters based on data collected from a wide variety of sources beyond TVWS database 410. For example, a given node 130 may determine the location and various settings associated with TV tower 402 by retrieving that information from other public sources via the Internet. Persons skilled in the art will understand that such information is widely available to the general public and may be acquired by nodes 130 via any technically feasible means. In general, nodes 130 may operate independently of server 154 and may not be required to interact with server 154 to acquire information pertaining to TV towers and the associated settings. In other words, nodes 130 may be configured to connect to the Internet and gather TV tower information autonomously.

Each node 130 may also be preconfigured to include a dataset that specifies the location and settings associated with particular TV towers. Instead of acquiring that information via external sources, such as the TVWS database 410 or public sources accessed across the Internet, a given node 130 may simply query the preconfigured dataset and determine/modify operating parameters based on that data. The dataset could be added to memory associated with each node 130 during manufacture, among other possibilities.

As previously mentioned, server 154 may communicate with optimized database 420 in order to retrieve QOS metrics for available channels at specific locations. Server 154 may determine operating parameters for nodes 130 based on the QOS metrics associated with those available channels. The QOS metric for a particular channel and particular location generally indicates the quality of that channel at that location, and, specifically, may indicate a packet loss rate associated with the channel and location or other specific types of quality metrics or combinations of quality metrics.

For example, the QOS metric for a channel and location could indicate an expected interference level associated with the channel and location and could be derived based on the inverse of the expected interference level. That interference level could be computed by implementing the aforementioned power loss modeling techniques, or could be derived from interference measurements performed by nodes 130 residing near the location.

Alternatively, the QOS metric for the channel and location could indicate the number of other TVWS devices currently operating on that channel and/or information describing those TVWS devices. In such a case, the QOS metric for the channel could have a lower value when the channel is currently occupied by a large number of TVWS devices. Similarly, the QOS metric for the channel could have a lower value when the channel is currently occupied by any number of TVWS devices that require a significant amount of bandwidth, such as, e.g., TVWS devices that support multimedia streaming.

The QOS metric for a channel and location could also be derived from any combination of different factors, including expected interference levels due to nearby TV towers, expected interference levels due to other TVWS devices, expected bandwidth available within the channel, reliability of the channel, flux of TVWS devices through the location, and so forth.

Optimized database 420 may have a wide range of different entries that reflect the QOS metrics associated with various channels and locations. In addition, optimized database 420 may have multiple different entries that reflect the QOS metric for a particular location and particular channel. For example, optimized database 420 could have an entry that reflects a QOS metric for a particular channel and location that is derived by implementing the power loss modeling techniques described above. Additionally, optimized database 420 could also include other entries that each reflects a measured QOS metric for the particular channel and particular location, as reported by nodes 130. An exemplary database table within optimized database 420 that reflects different exemplary entries is described in greater detail below in conjunction with FIG. 7.

FIG. 7 is a conceptual diagram that illustrates an exemplary table 700 in optimized database 420 shown in FIG. 4 that includes quality of service metrics for channels on which nodes 130 of FIG. 4 may communicate, according to one embodiment of the present invention. As shown, table 700 includes a set of columns and a set of rows. The columns of table 700 include a primary key (PK) column 702, a latitude column 704, a longitude column 706, a channel column 708, a quality of service column 710, a node identifier (nodeID) column 712, and a timestamp column 714. The rows of table 700 correspond to different entries within that table, and include entries 720, 721, and 722 through 720+N.

A given entry includes a PK value that represents a unique identifier for the entry within table 700, latitude and longitude values that represent a particular location on the surface of the Earth, a channel that may represent a range of frequencies or a frequency hopping sequence, and a QOS value. The QOS value represents the quality of the channel at the particular location. The given entry may also include a nodeID in situations where the QOS value associated with the entry was computed and reported by a node 130. The nodeID may be "null" when the QOS value is not associated with a particular node 130, such as, e.g., in situations where the QOS value is derived based on the power loss modeling approach previously described. The given entry may also include a timestamp that reflects a time when the entry was added to table 700 or a time when the QOS was computed. In one embodiment, an entry of table 700 includes multiple different timestamps that could reflect, for example, a time when the entry was added, a time when the QOS was computed, a time when the QOS was updated, or any other relevant times.

Persons skilled in the art will understand that table 700 is described herein for exemplary purposes only and that the various columns associated with table 700 may vary in practice. In general, optimized database 420 may be structured according to a wide variety of different database schemas and may include multiple different tables. Accordingly, the various approaches discussed herein may be applicable to any table or tables within optimized database 420.

Referring back now to FIG. 4, nodes 130 may repeatedly report measured QOS metrics for different channels and locations to server 154, and server 154 may, in turn, cause optimized database 420 to generate additional entries that reflect these newly-measured QOS metrics. Nodes 130 may also simply report QOS metrics directly to optimized database 420 without interacting with server 154. With this approach, optimized database 420 may include up-to-date entries that reflect the QOS metrics for different TVWS channels at a variety of different locations. In situation where the expected interference levels (i.e. those computed based on power loss modeling) diverge from the actual interference levels, optimized database 420 may include entries that reflect the actual interference levels. For example, the expected interference levels proximate to TV tower 400 may be quite high, although the actual interference levels proximate to TV tower 400 within the walls of a building may be quite low. Optimized database 420 may include entries that reflect the actual interference levels.

Based on the information stored within optimized database 420, as well as that stored within TVWS database 410, server 154 is capable of determining operating parameters for the nodes 130. In one embodiment, a given node 130 may request new operating parameters from server 154, and server 154 may then retrieve a set of entries from optimized database 420 that are associated with the location of the given node 130. Server 154 may process those entries and determine new operating parameters, including one or more channels with which the given node 130 should implement for future communications, among other things. Server 154 may then transmit the operating parameters to the given node 130. In response, the given node 130 may interact with TVWS database 410 in order to determine which, if any, of the one or more channels associated with the new operating parameters are available for use. The given node 130 may then select an available channel from the one or more channels on which to perform future communications. The given node 130 may also implement the new operating parameters to perform future communications with a particular sensitivity, signal to noise ratio, and so forth.

In another embodiment, server 154 may act as a proxy mechanism for nodes 130. A given node 130 may request new operating parameters from server 154, and server 154 may then interact with TVWS database 410 on behalf of the given node 130 in order to determine which channels are available at the location occupied by the given node 130. Server 154 may then retrieve a set of entries from optimized database 420 that are associated with the location of the given node 130 and with the channels that are available at that location. Server 154 may process those entries and determine new operating parameters, including one or more channels, with which the given node 130 should implement for future communications. Server 154 may then transmit the operating parameters to the given node 130. In response, the given node 130 may implement the new operating parameters to perform future communications on a particular channel with a particular sensitivity, signal to noise ratio, and so forth.

In either of the two embodiments discussed above, server 154 is configured to update optimized database 420 to reflect information derived from TVWS database 410. For example, if server 154 determines that a given channel is currently in use by a significant number of other TVWS devices (i.e. based on information provided by TVWS database 410), then server 154 may add an entry to optimized database 420 that reflects a low QOS metric for that channel. Server 154 may also update optimized database 420 to include entries indicating low QOS metrics (or QOS metrics of zero) for channels that are not available in certain regions.

When determining operating parameters for different nodes 130, server 154 is configured to account for the specific requirements of those different nodes 130. For example, a node 130 could request a channel with high bandwidth and a low error rate, and server 154 could provide that node with operating parameters that reflect a channel with a high QOS metric. In this example, the node 130 could be a multimedia device configured to stream audio and video data across the portion 412 of the network.

Server 154 may also allocate different channels to different groups of nodes 130 according to the requirements of those different groups of nodes 130. For example, server 154 could allocate a high-QOS channel to nodes 130 that require a low error rate, while allocating a low-QOS channel to nodes 130 with less stringent error rate requirements. These different groups of nodes 130 may represent different portions of network 102 or may be configured to interoperate on a particular channel. Alternatively, server 154 may determine groups of nodes 130 that have diverse requirements and then allocate different channels to each such group. A given group may include a balanced collection of nodes 130 with both high-QOS requirements and low-QOS requirements. Sever 154 is configured to perform any technically feasible grouping procedure and/or resource allocation procedure to generate groups of nodes 130 and to allocate channels to those groups.

When interacting with optimized database 420, server 154 may execute a wide variety of different queries, with widely varying complexity, against optimized database 420 in order to retrieve relevant entries when servicing a particular request from a node 130. Server 154 may also process entries returned for a given query in order to select a channel for the requesting node 130. For example, server 154 could query optimized database 420 for entries associated with a particular location and having a threshold QOS metric. Then, server 154 could process the returned entries to identify a channel with minimal variation of QOS metric across different entries associated with that channel. Persons skilled in the art will understand that such post-processing of returned entries may vary widely based on the specific requirements of the requesting node 130.

As mentioned above, any given node 130 may implement some or all of the functionality described as being performed by the server 154. In some situations, a node 130 may operate autonomously and may have limited interaction with server 154. In such situations, the node 130 may access TVWS database 410, optimized database 420, generate QOS metrics and report those metrics to optimized database 420, determine and/or modify operating parameters, and so forth, without interacting with server 154.

Persons skilled in the art will recognize that the approaches described above may be applied to nodes 130 that reside within any technically feasible class of network beyond a wireless mesh network. For example, nodes 130 may reside within a star network or personal area network (PAN) and implement the different approaches described herein. Additionally, the approaches described thus far may be implemented to mitigate interference caused by a wide variety of different types of devices beyond TV towers. For example, nodes 130 may reside within a network having a tiered priority system (a tiered network). In a tiered network, high-priority devices may have a higher transmit power, or more relaxed out-of-band transmit rules compared to nodes 130. The priorities of the different devices in the network may be derived from specific licensing agreements that regulate the operation of those devices. Nodes 130 may be configured to mitigate interference caused by higher-priority devices within that network by implementing the approaches described herein. A tiered network could be, for example, the T108 network in Japan. In the context of the T108 network, a node configured to transmit at 20 milliwatts (mW) could implement the disclosed techniques in order to mitigate interference caused by a higher-priority device configured to transmit at 250 mW.

By implementing the different approaches described herein, either independently or in conjunction with one another, server 154 and/or nodes 130 may determine operating parameters for nodes 130 that allow those nodes to communicate despite interference. Accordingly, the various approaches described may allow nodes within a network, such as wireless mesh network 102 shown in FIG. 1, to reside substantially closer to a source of interference, such as TV tower 400, while maintaining reliable communication. The different techniques discussed thus far are described in greater detail below in conjunction with FIGS. 8-10.

Figure 8:
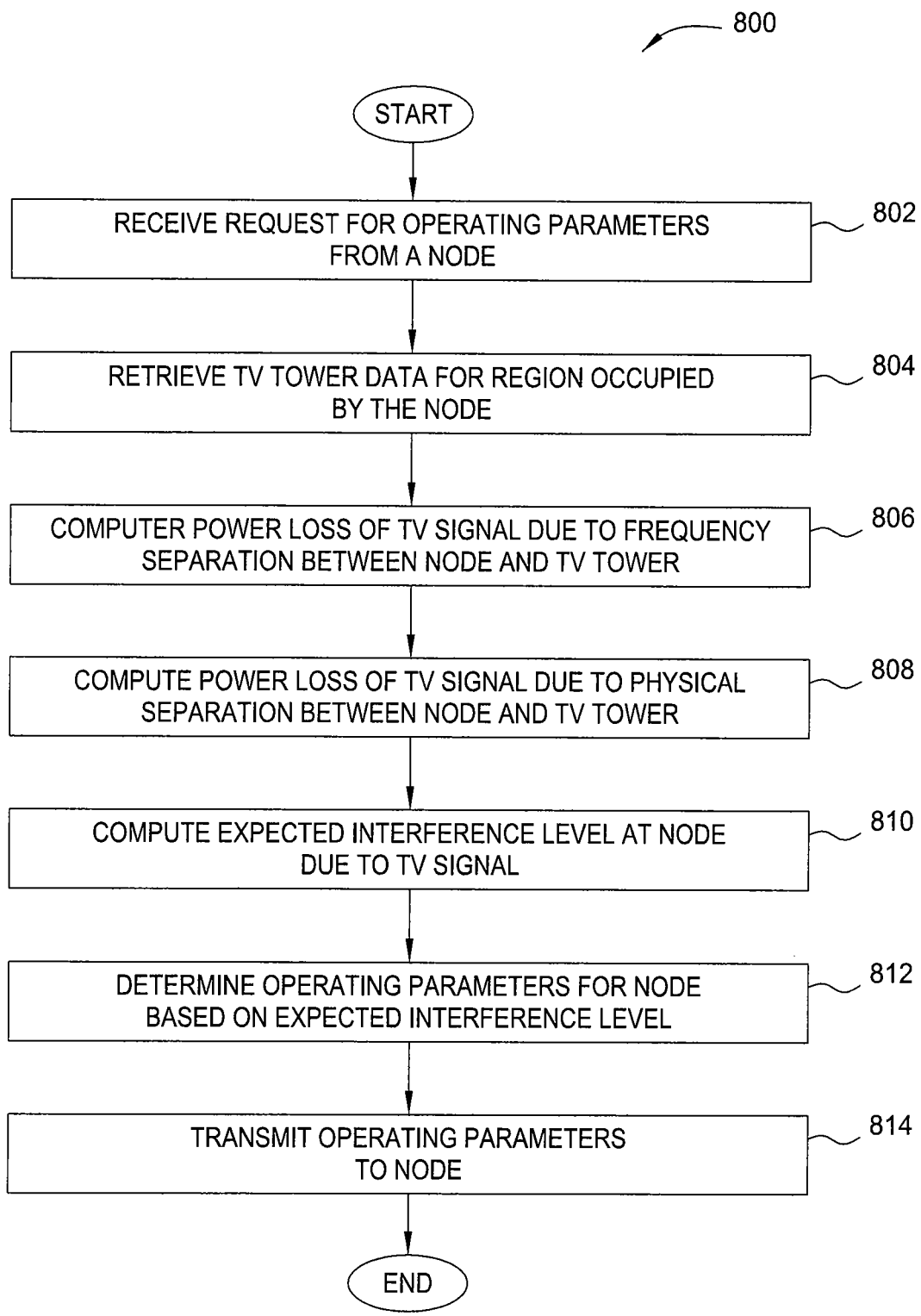
FIG. 8 is a flow diagram of method steps for estimating the level of interference caused by the TV signal of FIG. 4, according to one embodiment of the present invention.

FIG. 8 is a flow diagram of method steps for estimating the level of interference caused by TV signal 402 of FIG. 4, according to one embodiment of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where server 154 receives a request for operating parameters from a node 130, such as node 130-7 or 130-8. The request may also indicate a specific use-case associated with the node 130. For example, the request could indicate that the node 130 supports multimedia streaming and is requesting operating parameters that would support that functionality.

At step 804, server 154 retrieves TV tower data from TVWS database 410. The TV tower data may reflect a set of available channels in a region proximate to the node 130 as well as power and frequency settings associated with one or more TV towers proximate to that node, including TV tower 400.

At step 806, server 154 computes the power loss of TV signal 402 due to frequency separation between TV signal 402 and a frequency at which a node 130 may communicate. Server 154 may perform step 802 by implementing the power loss modeling technique described in conjunction with graph 600 shown in FIG. 6.

At step 808, server 154 computes the power loss of TV signal 402 due to physical separation between TV tower 400 and the node 130. The physical separation could be, e.g., distance 414 or 416 shown in FIG. 4. Server 154 may perform step 802 by implementing the power loss modeling technique described in conjunction with graph 640 shown in FIG. 6.

At step 810, server 154 computes the expected interference level at the node 130 due to TV signal 402 by combining the power loss computed at step 804 with that computed at step 806. In one embodiment, server 154 computes the expected amount of interference as: interference=initial power of TV signal 402−power loss due to frequency separation−power loss due to physical separation.

At step 812, server 154 determines operating parameters for the node 130 based on the expected interference level due to TV signal 402. The operating parameters determined for the node 130 may include a selected channel on which to communicate, a particular sensitivity with which to process received signals, a target signal-to-noise ratio implemented for a signal to be transmitted, or other parameters that may influence the quality and strength of signals involved with communication with other nodes 130. At step 814, the server 154 transmits the operating parameters to the node 130. The node 130 may then perform communications according to those operating parameters. The method 800 then ends. With this approach, server 154 is configured to determine operating parameters for the node 130 that may mitigate interference caused by TV signal 402.

In one embodiment, the node 130 may also implement some or all of the method 800. For example, the node 130 could perform step 804 and communicate with TVWS database 410 to determine a set of available channels at a particular location as well as transmitter settings associated with any nearby TV towers. The node 130 could then perform steps 806, 808, 810, and 812, or a simplified version of those techniques, and then determine new operational settings with which future communications should be performed. The simplified version of those techniques could include accessing a look-up table indexed based on interference levels that provides specific operational settings corresponding to specific interference levels.

Server 154 may also determine operating parameters for nodes 130 based on QOS metrics retrieved from optimized database 420. Server 154 may then update optimized database 420 based on QOS metrics reported by nodes 130, as described in greater detail below in conjunction with FIG. 9.

Figure 9:
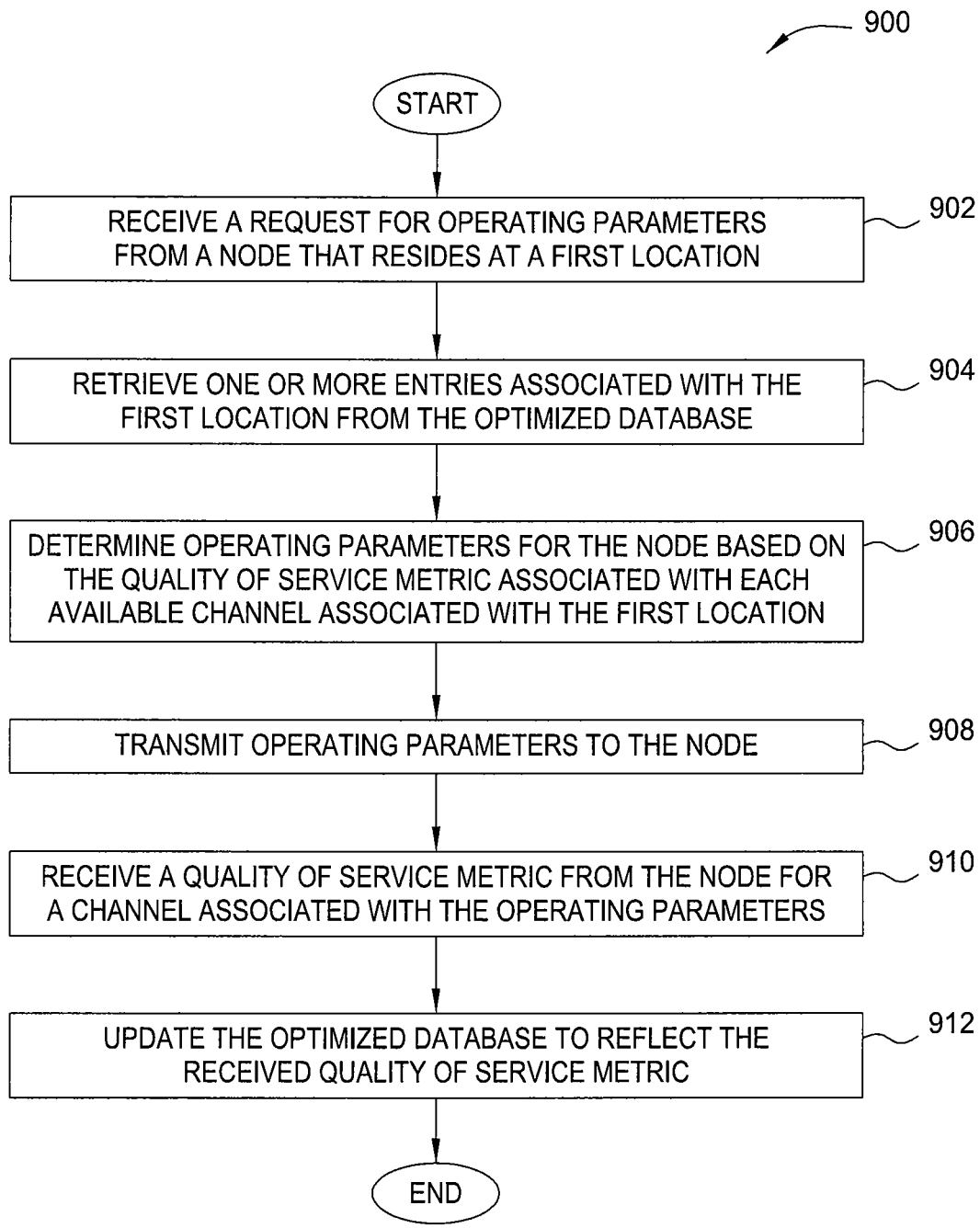
FIG. 9 is a flow diagram of method steps for updating the optimized database of FIG. 4 to reflect quality of service metrics received from one of the nodes of FIG. 4, according to one embodiment of the present invention.

FIG. 9 is a flow diagram of method steps for updating optimized database 420 of FIG. 4 to reflect QOS metrics received from one of nodes 130 of FIG. 4, according to one embodiment of the present invention. Although the method steps are described in conjunction with the systems of FIGS. 1-7, persons skilled in the art will understand that any system configured to perform the method steps, in any order, is within the scope of the present invention.

As shown, a method 900 begins at step 902, where server 154 receives a request for operating parameters from a node 130 that resides at a first location. At step 904, server 154 retrieves one or more entries associated with the first location from optimization database 420. Server 154 may also retrieve the one or more entries based on a minimum QOS metric required by the node 130 or other requirements associated with the node 130.

At step 906, server 154 determines operating parameters for the node 130 based on the QOS metric associated with each available channel associated with the first location. Server 154 could, for example, simply select the channel having the highest QOS metric, then determine operating parameters for the nodes 130 based on the selected channel.

At step 908, server 154 transmits the operating parameters to the node 130. The node 130 may then perform a reconfiguration process based on those operating parameters and then perform future communications according to those operating parameters. The node 130 may also perform various measurements in order to determine a QOS metric for the channel associated with the operating parameters received from server 154, and then transmit that QOS metric to server 154.

At step 910, server 154 receives a QOS metric from the node 130 for the channel associated with the operational parameters. The QOS metric may represent a more current representation of the QOS of that channel than is present in optimized database 420. At step 912, server 154 updates optimized database 420 to reflect the QOS metric. The method 900 then ends.

With this approach, server 154 may update optimized database 420 to include up-to-date entries that reflect the QOS metrics for different TVWS channels at a variety of different locations.

Figure 10:
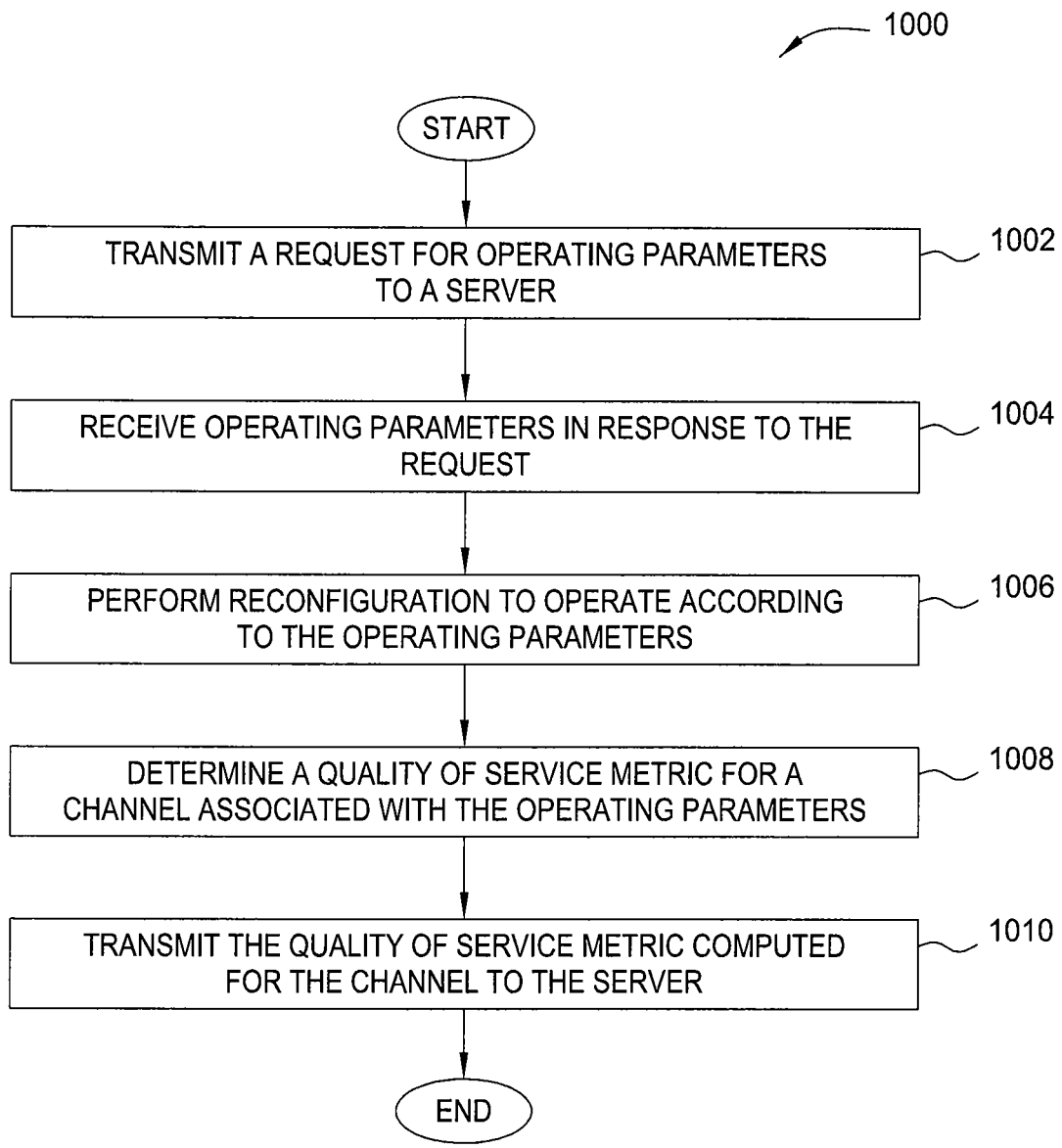
FIG. 10 is a flow diagram of method steps for reconfiguring one of the nodes of FIG. 4 to mitigate the interference caused by the TV signal of FIG. 4, according to one embodiment of the present invention.

FIG. 10 is a flow diagram of method steps for reconfiguring one of nodes 130 of FIG. 4 to mitigate the interference caused by TV signal 402 of FIG. 4, according to one embodiment of the present invention. Although the method steps are described in conjunction with the systems of FIGS. 1-7, persons skilled in the art will understand that any system configured to perform the method steps, in any order, is within the scope of the present invention.

As shown, a method 1000 begins at step 1002, where a node 130 transmits a request for operating parameters to server 154. The node 130 may be subject to interference caused by, e.g., TV signal 402. At step 1004, the node 130 receives new operating parameters from server 154. At step 1006, the node 130 performs a reconfiguration in order to operate according to the operating parameters. In doing so, the node 130 may switch channels and proceed to communicate on a channel specified by the operating parameters. The node 130 may also communicate with a particular sensitivity, signal-to-noise ratio, and other operating parameters.

At step 1008, the node 130 determines a QOS metric for the channel associated with the operating parameters. The QOS metric may represent, for example, a packet loss rate, among other quality metrics associated with wireless communication. At step 1010, the node 130 transmits the QOS metric to server 154.

With this approach, nodes 130 may repeatedly report measured QOS metrics for different channels and locations to server 154. Server 154 may then update optimized database 420 accordingly, as described above in conjunction with FIG. 9. Optimized database 420 may thus include up-to-date entries that reflect the QOS metrics for different TVWS channels at a variety of different locations.

In sum, nodes within a network are configured to communicate with one another on one or more television white space (TVWS) frequencies that may be subject to interference caused by nearby TV towers. In order to mitigate that interference, the nodes may be configured to communicate according to specific operating parameters. The operating parameters may be generated based on expected interference levels caused by the nearby TV towers or QOS metrics associated with available channels. The nodes may also update a private database to reflect the expected interference levels or measured QOS metrics for different channels.

Advantageously, a network of nodes is configured to perform wireless communications within a TVWS spectrum despite interference that may be caused by nearby TV towers. In addition, those nodes are configured to update the private database so that other nodes may determine operating parameters that mitigate that interference.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

The invention claimed is:

1. A computer-implemented method for configuring a node to communicate on a television white space (TVWS) spectrum of frequencies, the method comprising:
   receiving, at a server, a request for at least one operating parameter from a first node that resides at a first location in a network;
   retrieving, from a first database, a list of one or more TVWS channels available at the first location;
   in response to retrieving the list of one or more TVWS channels from the first database, retrieving, from a second database, one or more quality of service metrics based on the list of one or more TVWS channels retrieved from the first database, wherein the second database is different from the first database;
   determining the at least one operating parameter for the first node based on the one or more quality of service metrics; and
   transmitting the at least one operating parameter to the first node, wherein the at least one operating parameter transmitted to the first node includes a sensitivity value that is used by the first node to process one or more signals received on a first available TVWS channel, and the first node is configured to perform future communications over the first available TVWS channel according to the at least one operating parameter.

2. The computer-implemented method of claim 1, further comprising:
   receiving from the first node a first quality of service metric associated with the first available TVWS channel and the first location; and
   updating the second database to include an entry that includes the first quality of service metric, the first available TVWS channel, and the first location.

3. The computer-implemented method of claim 1, further comprising:
   receiving the at least one operating parameter;
   configuring a network interface associated with the first node to communicate over the first available TVWS channel according to the at least one operating parameter;
   generating a first quality of service metric associated with communication operations performed over the first available TVWS channel; and transmitting the first quality of service metric to the server.

4. The computer-implemented method of claim 1, wherein the at least one operating parameter transmitted to the first node further includes a target signal-to-noise ratio with which signals are to be transmitted by the first node over the first available TVWS channel.

5. The computer-implemented method of claim 1, wherein a first quality of service metric associated with the first available TVWS channel reflects a packet loss rate associated with the first available TVWS channel previously measured by a node configured to communicate over the first available TVWS channel at the first location.

6. The computer-implemented method of claim 1, wherein a first quality of service metric associated with the first available TVWS channel reflects the inverse of an expected interference level associated with the first available TVWS channel at the first location.

7. The computer-implemented method of claim 6, further comprising generating the expected interference level by:
   computing a first power loss associated with a TV signal based on frequency separation between a frequency associated with the first available TVWS channel and a frequency associated with a channel on which a TV tower transmits the TV signal;
   computing a second power loss associated with the TV signal based on physical separation between a location associated with the TV tower and the first location; and
   reducing an initial power level associated with the TV signal by the first power loss and by the second power loss.

8. The computer-implemented method of claim 7, further comprising:
   retrieving the frequency associated with the channel on which the TV tower transmits the TV signal, the location associated with the TV tower, and the initial power level associated with the TV signal from a third database,
   wherein the third database comprises a public database, and
   wherein the second database comprises a private database.

9. The computer-implemented method of claim 7, wherein the first power loss is computed based on a frequency loss model, and the second power loss is computed based on a path loss model.

10. The computer-implemented method of claim 1, wherein a first quality of service metric is derived from a power loss model and a second quality of service metric is reported by a node at the first location.

11. The computer-implemented method of claim 1, wherein a first quality of service metric is determined based on a combination of a first factor and a second factor, and a second quality of service metric is determined based on a combination of a third factor and a fourth factor.

12. The computer-implemented method of claim 1, wherein a first quality of service metric associated with the first available TVWS channel indicates an expected available bandwidth for the first available TVWS channel at the first location.

13. The computer-implemented method of claim 1, wherein a first quality of service metric associated with the first available TVWS channel indicates a flux of TVWS devices through the first location.

14. The computer-implemented method of claim 1, wherein the server updates the second database based on information retrieved from the first database.

15. One or more non-transitory computer-readable media storing program instructions that, when executed by one or more processing units, cause the one or more processing units to configure a node to communicate on a television white space (TVWS) spectrum of frequencies, by performing the steps of:
   receiving, at a server, a request for at least one operating parameter from a first node that resides at a first location in a network;
   retrieving, from a first database, a list of one or more TVWS channels available at the first location;
   in response to retrieving the list of one or more TVWS channels from the first database, retrieving, from a second database, one or more quality of service metrics based on the list of one or more TVWS channels retrieved from the first database, wherein the second database is different from the first database;
   determining the at least one operating parameter for the first node based on the one or more quality of service metrics; and
   transmitting the at least one operating parameter to the first node, wherein the at least one operating parameter transmitted to the first node includes a sensitivity value that is used by the first node to process one or more signals received on a first available TVWS channel, and the first node is configured to perform future communications over the first available TVWS channel according to the at least one operating parameter.

16. The one or more non-transitory computer-readable media of claim 15, further comprising the steps of:
   receiving from the first node a first quality of service metric associated with the first available TVWS channel and the first location; and
   updating the second database to include an entry that includes the first quality of service metric, the first available TVWS channel, and the first location.

17. The one or more non-transitory computer-readable media of claim 15, further comprising the steps of:
   receiving the at least one operating parameter;
   configuring a network interface associated with the first node to communicate over the first available TVWS channel according to the at least one operating parameter;
   generating a first quality of service metric associated with communication operations performed over the first available TVWS channel; and
   transmitting the first quality of service metric to the server.

18. The one or more non-transitory computer-readable media of claim 15, wherein the at least one operating parameter transmitted to the first node further includes a target signal-to-noise ratio with which signals are to be transmitted by the first node over the first available channel.

19. The one or more non-transitory computer-readable media of claim 15, wherein a first quality of service metric associated with the first available TVWS channel reflects a packet loss rate associated with the first available TVWS channel previously measured by a node configured to communicate over the first available TVWS channel at the first location.

20. The one or more non-transitory computer-readable media of claim 15, wherein a first quality of service metric associated with the first available TVWS channel reflects the inverse of an expected interference level associated with the first available TVWS channel at the first location.

21. The one or more non-transitory computer-readable media of claim 20, further comprising generating the expected interference level by:
  computing a first power loss associated with a TV signal based on frequency separation between a frequency associated with the first available TVWS channel and a frequency associated with a channel on which a TV tower transmits the TV signal;
  computing a second power loss associated with the TV signal based on physical separation between a location associated with the TV tower and the first location; and
  reducing an initial power level associated with the TV signal by the first power loss and by the second power loss.

22. The one or more non-transitory computer-readable media of claim 21, further comprising:
  retrieving the frequency associated with the channel on which the TV tower transmits the TV signal, the location associated with the TV tower, and the initial power level associated with the TV signal from a third database,
  wherein the third database comprises a public database, and
  wherein the second database comprises a private database.

23. The one or more non-transitory computer-readable media of claim 21, wherein the first power loss is computed based on a frequency loss model, and the second power loss is computed based on a path loss model.

24. A system for configuring a node to communicate on a television white space (TVWS) spectrum of frequencies, including:
  one or more processing units that reside within a server and are configured to:
    receive a request for at least one operating parameter from a first node that resides at a first location in a network,
    retrieve, from a first database, a list of one or more TVWS channels available at the first location,
    in response to retrieving the list of one or more TVWS channels from the first database, retrieve, from a second database, one or more quality of service metrics based on the list of one or more TVWS channels retrieved from the first database, wherein the second database is different from the first database,
    determine the at least one operating parameter for the first node based on the one or more quality of service metrics, and
    transmit the at least one operating parameter to the first node, wherein the at least one operating parameter transmitted to the first node includes a sensitivity value that is used by the first node to process one or more signals received on a first available TVWS channel, and the first node is configured to perform future communications over the first available TVWS channel according to the at least one operating parameter.

25. The system of claim 24, further including:
  one or more memory units coupled to the one or more processing units and storing program instructions that, when executed by the one or more processing units, cause the one or more processing units to:
    receive the request for the at least one operating parameter,
    retrieve the list of the one or more TVWS channels available at the first location from the first database,
    retrieve the one or more quality of service metrics for the one or more TVWS channels indicated in the list retrieved from the first database from the second database,
    determine the at least one operating parameter for the first node based on the one or more quality of service metrics, and
    transmit the at least one operating parameter to the first node.

26. A computer-implemented method performed by a node for configuring the node to communicate on a television white space (TVWS) spectrum of frequencies, the method comprising:
  transmitting to a server, by a first node that resides at a first location in a network, a request for at least one operating parameter;
  receiving from the server, at the first node, at least one operating parameter for the first node determined based on a list of one or more TVWS channels available at the first location retrieved from a first database, and based on one or more quality of service metrics retrieved, in response to retrieving the list of one or more TVWS channels from the first database, from a second database based on the list of one or more TVWS channels retrieved from the first database, wherein the second database is different from the first database, and the at least one operating parameter received at the first node includes a sensitivity value that is used by the first node to process one or more signals received on a first available TVWS channel; and
  configuring, by the first node, a transceiver within the first node to perform future communications over the first available TVWS channel according to the at least one operating parameter.

27. The computer-implemented method of claim 26, wherein a quality of service metric associated with a given TVWS channel reflects an inverse of an expected interference level associated with the given TVWS channel at the first location.

28. The computer-implemented method of claim 26, wherein the first database resides external to the first node at a second location within the network.

29. The computer-implemented method of claim 26, wherein the server is preconfigured to include the first database, and wherein the first database includes location and transmitter settings associated with a set of television (TV) towers.

* * * * *